(12) United States Patent
Schlezinger et al.

(10) Patent No.: US 12,544,797 B2
(45) Date of Patent: Feb. 10, 2026

(54) HIGH SPEED SUBSTRATE SORTER

(71) Applicant: Applied Materials, Inc., Santa Clara, CA (US)

(72) Inventors: Asaf Schlezinger, Modi'in (IL); Markus J. Stopper, Voerstetten (DE)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 18/929,282

(22) Filed: Oct. 28, 2024

(65) Prior Publication Data
US 2025/0121411 A1   Apr. 17, 2025

Related U.S. Application Data

(63) Continuation of application No. 18/217,333, filed on Jun. 30, 2023, now Pat. No. 12,128,446.

(51) Int. Cl.
*B07B 13/00* (2006.01)
*B25J 11/00* (2006.01)
*B25J 15/06* (2006.01)

(52) U.S. Cl.
CPC ......... *B07B 13/003* (2013.01); *B25J 11/0095* (2013.01); *B25J 15/0616* (2013.01)

(58) Field of Classification Search
CPC ....... B07B 13/003; B07B 13/04; B07B 13/16; B25J 11/0095; B25J 15/0616; B25J 15/0658; B25J 15/0691
USPC ....................................................... 209/606
See application file for complete search history.

(56) References Cited

U.S. PATENT DOCUMENTS

| | | | |
|---|---|---|---|
| 10,937,683 B1 * | 3/2021 | Schlezinger | H01L 21/67715 |
| 2009/0305441 A1 | 12/2009 | Baccini et al. | |
| 2015/0028612 A1 * | 1/2015 | Andrews | A61F 13/15764 |
| | | | 294/188 |
| 2017/0170041 A1 | 6/2017 | Stopper et al. | |
| 2018/0029086 A1 * | 2/2018 | Prystupa | B07C 5/362 |
| 2019/0022705 A1 | 1/2019 | Stopper et al. | |
| 2021/0276814 A1 * | 9/2021 | Prystupa | B23P 19/004 |
| 2023/0075394 A1 | 3/2023 | Schlezinger et al. | |

FOREIGN PATENT DOCUMENTS

| CN | 102236034 A | 11/2011 |
|---|---|---|
| CN | 116169055 A | 5/2023 |

OTHER PUBLICATIONS

International Search Report and Written Opinion for PCT/US2023/079142 dated Mar. 25, 2024.

* cited by examiner

*Primary Examiner* — Michael Mccullough
*Assistant Examiner* — Jessica L Burkman
(74) *Attorney, Agent, or Firm* — Patterson + Sheridan, LLP

(57) ABSTRACT

Disclosed herein are a substrate sorter, an inspection and sorting system having the substrate sorter, and a method for the inspection and sorting system. The substrate sorter includes an annular gripper comprising a rotator and a plurality of vacuum applicators concyclically disposed around an axis, a carrier operable to move a substrate towards the rotator and into a loading region below the rotator, and an actuator coupled with the annular gripper and operable to rotate the rotator about the axis relative to the plurality of vacuum applicators while one or more of the plurality of vacuum applicators hold the substrate against the rotator.

19 Claims, 8 Drawing Sheets

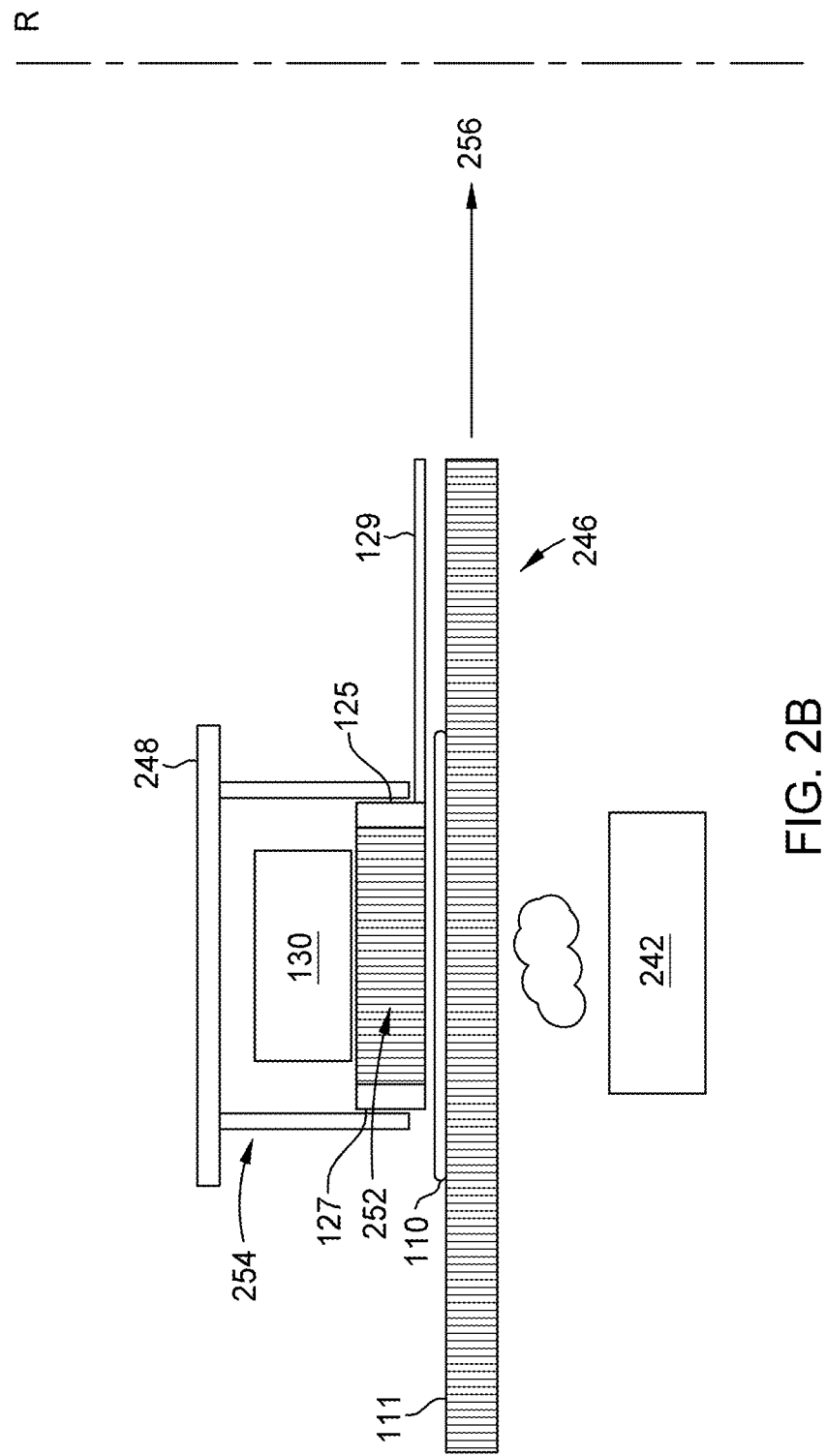

HIGH SPEED SUBSTRATE SORTER

CROSS REFERENCE TO RELATED APPLICATION

This Application is a continuation of U.S. Non-Provisional application Ser. No. 18/217,333, filed on Jun. 30, 2023, now U.S. Pat. No. 12,128,446, issued on Oct. 29, 2024, which is incorporated herein by reference in its entirety.

BACKGROUND

Field

Embodiments of the present disclosure generally relate to a high speed semiconductor sorting equipment and an semiconductor inspection system including such a sorting equipment. More specifically, embodiments disclosed herein relate to a substrate sorter and method thereof for sorting substrates traveling on a high speed carrier.

Description of the Related Art

Semiconductor substrates are routinely inspected by a metrology system, before processing, to obtain characteristics and defects of substrates to ensure strictly compliance with predetermined quality control standards. A metrology system can provide comprehensive data regarding substrates, such as physical dimensions, optical properties, electrical properties, crystal structures, and etc. After inspections are completed, substrates are sorted and transferred to designated containers assigned according to their specific characteristics.

As substrates can be inspected by metrology stations in parallel, the sorting and transferring of inspected substrates can be a limiting factor to the throughput of a metrology system. For example, a rotary sorter for sorting and transferring inspected substrates employs an indexing motion that rotates in a stop-and-go manner. In such a sorter, a picking arm rotated into a pickup area, and then the motion is stopped to allow a substrate to be picked up by the picking arm. Once the substrate has been picked up by the picking arm, the motion of the picking arm would restart to rotate the picking arm out of the pickup area. However, the start and stop index motion limits the throughput through the system and provides significant challenges for increasing the speed of handling inspected substrates.

Furthermore, the start and stop index motion needs to frequently accelerate and decelerate the picking arm, and hence, requires very powerful motors and brakes. As such, vibrations are inevitable induced by such an indexing motion. Additionally, as the speed of the indexing motion increases, service and preventative maintenance frequencies also undesirably increase.

Thus, an improved sorting and transferring system is needed.

SUMMARY

Disclosed herein are a substrate sorter, an inspection and sorting system including the substrate sorter, and a method for the inspection and sorting system. The substrate sorter includes an annular gripper comprising a rotator and a plurality of vacuum applicators concyclically disposed around an axis, a carrier operable to move a substrate towards the rotator and into a loading region below the rotator, and an actuator coupled with the annular gripper and operable to rotate the rotator about the axis relative to the plurality of vacuum applicators while one or more of the plurality of vacuum applicators hold the substrate against the rotator.

In another example, disclosed herein is a system for inspecting and sorting a plurality of substrates. The system comprises a loading unit operable to load a substrate; a metrology unit coupled with the loading unit; and a sorting unit as set forth in the present application and coupled with the metrology unit.

In yet another example, disclosed herein is a method for inspecting and sorting a plurality of substrates. The method comprises operations of performing a metrology process on a substrate in a metrology unit, assigning the substrate to a collection bin based on substrate information obtained by the metrology process; transferring the substrate out of the metrology unit on a carrier and passing a loading region where the carrier and a sorter intersects, the sorter comprising a rotator and a plurality of vacuum applicators; keeping the plurality of vacuum applicators stationary relative to the axis; rotating the rotator about the axis relative to the plurality of vacuum applicators while one or more of the plurality of vacuum applicators hold the substrate against the rotator; picking up the substrate from the carrier by the rotator while the rotator continuously rotates; rotating the rotator and the substrate to the collection bin; and releasing the substrate from the rotator to the collection bin.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments of this disclosure and are therefore not to be considered limiting of its scope, for the disclosure may be applied to other equally effective embodiments.

FIG. 2B illustrates a cross-sectional view of a loading region in FIG. 1, according to one embodiment.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure generally relate to a substrate sorter, an inspection and sorting system including the substrate sorter, and a method for the inspection and sorting system. The substrate sorter utilizes a non-indexing (i.e., continuous) motion to drive a sorter to run on the fly, non-stop during the process to pick up substrates and transfer the same into designated locations. Vacuum of the sorting apparatus for picking up the substrates are no longer discrete and indexed. The vacuum applicators spin continuously even during the process of picking up a substrate. In other words, two processes: picking up a substrate and rotating the vacuum applicators occur in parallel. This sorting apparatus reduces the need of a powerful motor, avoids the generation of vibrations caused by the frequent acceleration and deceleration of an indexing motion, and increases the throughput of the sorting apparatus as well as the substrate inspection system.

Figure 1:
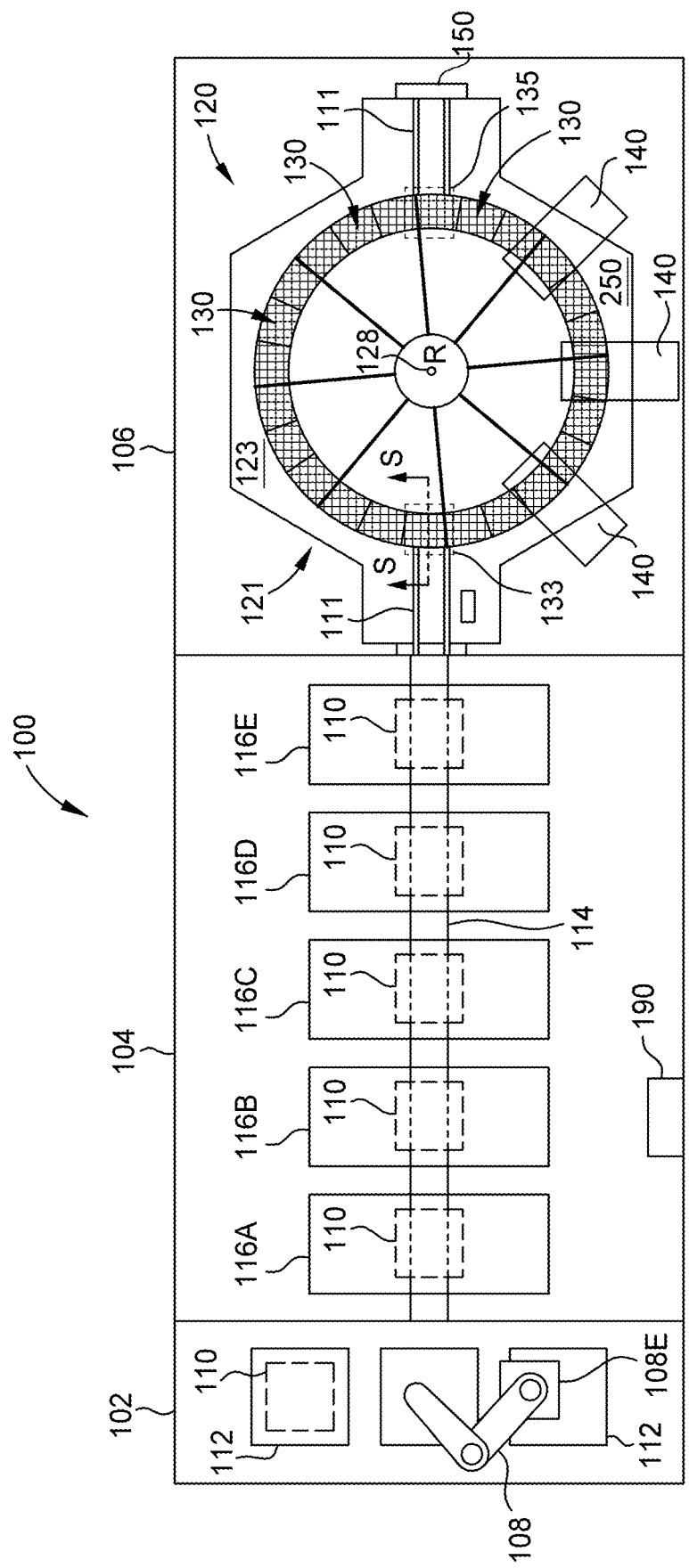
FIG. 1 illustrates a top plan view of an inspection system, according to one embodiment.

FIG. 1 illustrates a top plan view of an inspection system 100, according to one embodiment. The inspection system 100 includes a loading unit 102, a metrology unit 104, and a sorting unit 106. The loading unit 102 receives one or more cassettes 112 containing substrates 110 in a stacked configuration. The loading unit 102 includes a computer (not shown) having a graphical user interface adapted to present information related to operations occurring in the loading unit 102, including processing metrics, lot numbers, and the like. The modular unit 104 may be, for example, a metrology unit. The sorting unit 106 may be, for example a sorting module. The loading unit 102, the modular unit 104, and the sorting unit 106 may be, by way of example only, disposed linearly relative to another.

The loading unit 102 includes a transfer robot 108 having support elements 108E, such as a suction element, end effector, and gripper clamp for gripping and transferring substrates 110. The transfer robot 108 is adapted to transfer substrates 110 from one or more cassettes 112 positioned within the loading unit 102 to a conveyor system 114. The conveyor system 114 may be a motor-driven conveyor system and may include one or more carriers 111, such as a conveyor, a conveyor belt, a pallet transporter, or tracks driven by an actuator through rollers and/or drive gears. The conveyor system 114 may be disposed in a linear arrangement to transfer substrates received from the transfer robot 108 through the modular unit 104. As such, the conveyor system 114 is disposed within the modular unit 104 and facilitates the transfer of substrates 110 through the modular unit 104. Additional modular units may be positioned between the loading unit 102 and the modular unit 104, and/or between the modular unit 104 and the sorting unit 106, and/or following the sorting unit 106 to facilitate expansion of the inspection system 100.

The modular unit 104 may include one or more metrology stations. In the embodiment of FIG. 1, the modular unit 104 includes five metrology stations 116A-116E. It is contemplated that the inspection system 100 may also be modified by adding or subtracting metrology stations to the modular unit 104, as space permits, rather than adding a second modular unit, thus increasing throughput and/or the number of metrology processes performed.

The metrology stations may include, by way of example only, any of the following: a micro-crack inspection unit, a thickness measuring unit, a resistivity measuring unit, a photoluminescence unit, a geometry inspection unit, a saw mark detection unit, a stain detection unit, a chip detection unit, and/or a crystal fraction detection unit. The micro-crack inspection unit may be, by way of example only, configured to inspect substrates for cracks, as well as to optionally determine crystal fraction of a substrate. The geometry inspection unit may be configured, by way of example only, to analyze surface properties of a substrate. The saw mark detection unit may be configured, by way of example only, to identify saw marks including groove, step, and double step marks on a substrate. The metrology stations may also include other examples beyond those listed above.

As a plurality of the substrates 110 can be inspected by the plurality of modular units 116 in parallel, a substrate carrier 111 travels at a high speed to transfer the substrates within the metrology unit 104 and transfer the inspected substrates 110 to the sorting unit 106. According to an embodiment, a throughput of the inspection system 100 may reach as high as 15,000 substrates per hour. In one example, the substrate carrier 111 is a belt conveyor. In another example, the substrate carrier 111 is a palletized conveyor. Other types of substrate carriers 111 may be utilized The sorting unit 106 contains a sorter 120 and a housing 121. According to an embodiment, the sorter 120 includes an annular gripper 123 configured to continuously rotate around an axis R during operation. The annular gripper 123 includes a gas permeable rotator (later identified by reference numeral 252 shown in FIG. 2B) that rotates below a plurality of vacuum applicators 130. The plurality of vacuum applicators 130 are disposed concyclically around an axis R, directly above the rotator. According to an embodiment, each vacuum applicator 130 is configured to independently pull a vacuum through the section of the rotator that is positioned below the vacuum applicator 130. For example, the rotator has a plurality of perforations for transmitting vacuum from the vacuum applicator 130 such that substrate 110 is retained to the section of the rotator directly below the vacuum applicator 130 providing the vacuum. The rotator may have any configuration or be made of any materials, as long as it is capable of holding the substrate 110 even after the plurality of perforations are generated. According to an embodiment, the rotator is made of plastic, such as polyacetal or polyoxymethylene, to avoid scratching the substrate 110. The plurality of the vacuum applicators 130 are individually controllable and capable of holding the substrate 110 in place by vacuum while the annular gripper 123 continuously rotates around the axis R. The vacuum applicators 130 may be assisted by separate device to raise the substrate 110 from the carrier 111 into contact with the rotator, such as an air nozzle disposed underneath the substrate 110 or a Bernoulli gripper disposed above the substrate 110.

The vacuum applicators 130 are configured to hold substrates 110 in place against the rotator. As the rotator rotates, the substrate 110 is held against the rotator first by one vacuum applicator 130, then by the next adjacent vacuum applicator 130, and so on, as the substrate 110 attached to the rotator rotates sequentially below the ring of adjacent vacuum applicators 130. Once the substrate 110 arrives at a designated collection bin 140 at the collection location 250 selected based on metrology results of the substrate 100, vacuum applied by the vacuum applicator 130 disposed above the designated collection location 250 is reduced or tuned off such that the substrate 110 is released from the rotator and fall into the designated collection location 250. A collection bin 140 may be disposed in the each collection location 250 such that the released substrate 110 is collected in the designated collection bin 140. The release may be implemented by raising the pressure of a vacuum applicator 130 above a threshold amount, i.e. reducing the vacuum power. The release can be implemented by shutting off the vacuum or filling the vacuum plenum of the vacuum applicator 130 with gas. According to an embodiment, a plurality of air nozzles may be disposed in the collection locations 250 that are configured to provide a stream of air toward the rotator in a direction opposite to the motion of the rotator. This stream of air is selected to slow down the momentum of the substrate 110 when the annular gripper 123 releases the substrate 110 without stopping the rotation of the rotator.

FIG. 1 shows that only 24 vacuum applicators 130 are included in the annular gripper 123. It is contemplated that a greater or fewer number of the vacuum applicators 130 may be utilized. According to an embodiment, the annular gripper 123 includes 12 vacuum applicators 130. According to another embodiment, the annular gripper 123 includes 36 vacuum applicators 130.

As shown in FIG. 1, the carrier 111 traverses the sorter 120 such that the inspected substrates 110 can be reached by the annular gripper 123. For example, the carrier 111 and the annular gripper 123 intersect each other at least at two loading regions 133 and 135. In the first loading region 133, the vacuum applicators 130 applied a vacuum through the rotator to pick up the substrate 110 for transfer to one of the collection locations 250. Defective or other non-sorted substrates 110 that are not to be sorted are passed below the annular gripper 123 to the second loading region 135 where defective substrates 110 are discarded.

Additionally, the carrier 111 can continue through the sorting unit 106 toward a connector 150. As such, if the sorting unit 106 is not sorting substrates 110, an inspected substrate 110 may bypass the sorter 120 of the sorting unit 106. Furthermore, if an inspected substrate 110 is not picked up by the sorter 120 the substrate may continue along the carrier 111 toward the connector 150. In certain embodiments, substrates not picked up by the sorter 120 may continue along the carrier 111 which may lead to a non-sorted substrate bin. In certain embodiments the sorting unit 106 may be further connected with additional units such as, by way of example only, additional inspection systems, additional sorting units, additional metrology units, etc. via the connector 150. The connector 150 may further allow the conveyor system 114 to align with the conveyor system of an additional unit such as, by way of example only, an additional inspection system, an additional sorting unit, an additional metrology units, etc.

The inspection system 100 may also include a controller 190. The controller facilitates the control and automation of the inspection system 100. The controller 190 may be coupled to or in communication with one or more of the conveyor system 114, the loading unit 102, the modular unit 104, the sorting unit 106, the transfer robot 108, and/or the metrology stations 116A-116E. The inspection system 100 may provide information to the controller 190 regarding substrate movement, substrate transferring, substrate sorting, and/or metrology performed.

The controller 190 may include a central processing unit (CPU) (not shown), memory (not shown), and support circuits (or I/O) (not shown). The CPU may be one of any form of computer processors that are used in industrial settings for controlling various processes and hardware (e.g., pattern generators, motors, and other hardware) and monitor the processes (e.g., processing time and substrate position or location). The memory (not shown) is connected to the CPU, and may be one or more of a readily available memory, such as random access memory (RAM), read only memory (ROM), floppy disk, hard disk, or any other form of digital storage, local or remote. Software instructions and data can be coded and stored within the memory for instructing the CPU. The support circuits (not shown) are also connected to the CPU for supporting the processor in a conventional manner. The support circuits may include conventional cache, power supplies, clock circuits, input/output circuitry, subsystems, and the like. A program (or computer instructions) readable by the controller 190 determines which tasks are performable on a substrate. The program may be software readable by the controller 190 and may include code to monitor and control, for example, the processing time and substrate position or location within the inspection system 100.

Figure 2A:
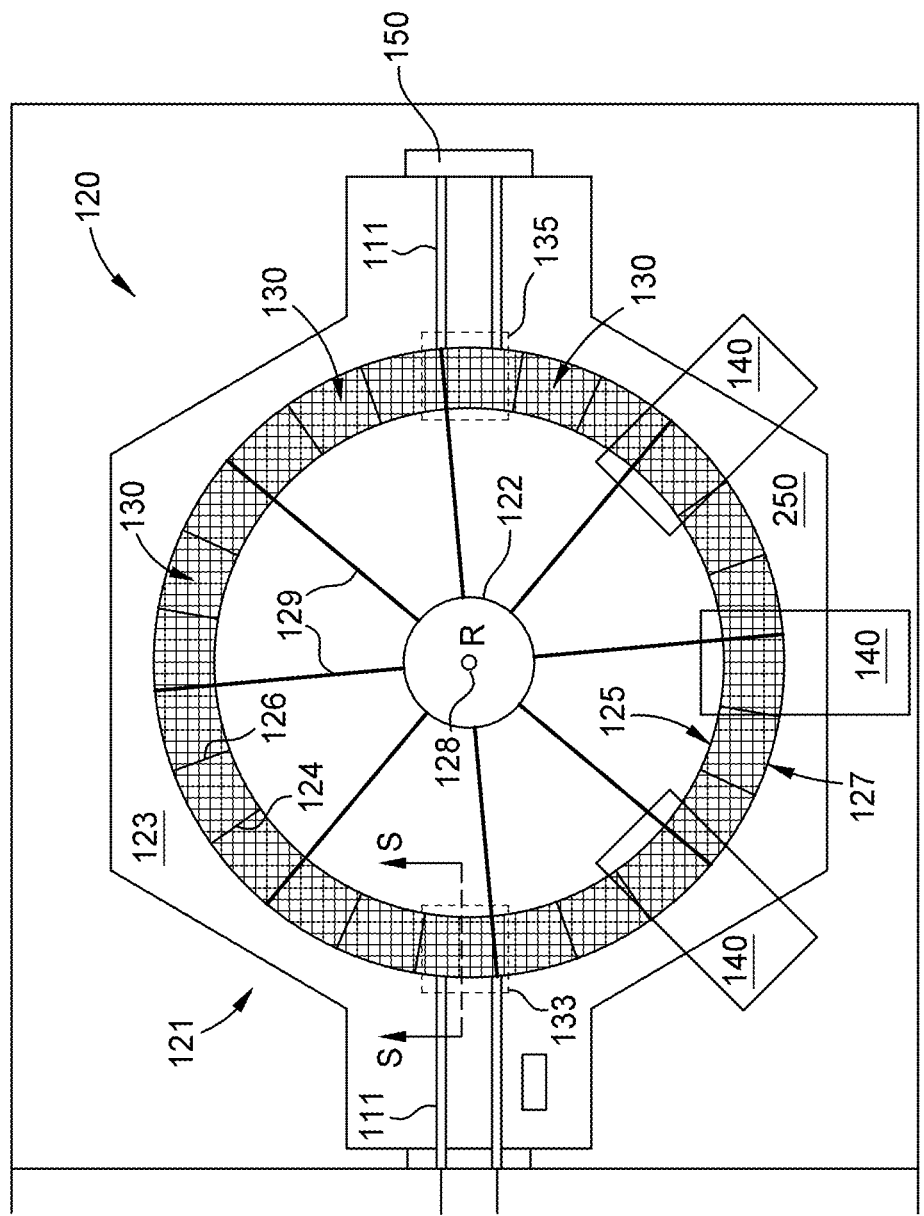
FIG. 2A illustrates a top plan view of the high speed substrate sorter of the inspection system of FIG. 1, according to one embodiment.

FIG. 2A illustrates a top plan view of the sorter 120 of FIG. 1. The rotator of the annular gripper 123 is supported by a support frame including an inner frame 125, an outer frame 127, a plurality of radially arranged tubular members 129, and a support platform 122. The support platform 122 is coupled to a rotary actuator 128, such as an electric motor, that rotates the support frame on the axis R. According to an embodiment, the annular gripper 123 is configured to continuously rotate around the axis R while the vacuum applicators 130 applies vacuum through the rotator to secure the substrate 110 from the carrier 111. In one example, the vacuum applicators 130 rotate with the rotator into the first loading region 133 around the axis R. In another example, the vacuum applicators 130 remain stationary while the rotator rotates around the axis R. The rotation of that the rotator continues without stop while the substrate 110 is picked up by the vacuum applicator 130 that is positioned over the first loading region 133. While the rotator rotates into the first loading region 133, the substrate 110 attached to the annular gripper 123 also rotate around the axis R. By conducting the picking up motion and the rotation motion in parallel or simultaneously, the sorter 120 can sort substrates 110 at a very high speed. The support platform 122 may be a rotary disc, a circular support, or any other shape. The plurality of tubular members 129 couple the inner frame 125 and the outer frame 127 with the support platform 122 via a suitable coupling mechanism, such as, for example, a welded connection, a pinned connection, a fastened connection, etc. The rotator is affixed between the inner frame 125 and the outer frame 127 such that the rotator rotated in unison with the support frame.

Each vacuum applicator 130 may include a left wall 124 and a right wall 126 separating that vacuum applicator 130 from the neighboring vacuum applicators 130, thus making the application of vacuum or pressure applied through the section of the rotator immediately in front of each vacuum applicator 130 individually controllable relative to the other vacuum applicators 130. Each vacuum applicator 130 generally includes a plenum box having one side open to the rotator, with the plenum within the plenum box being individually coupled to a vacuum source, and optionally also to a pressure source such that pressure and/or vacuum within each plenum may be separately controlled.

One or more substrate collection bins 140 are disposed around the peripheral areas of the annular gripper 123 in each of the collection locations 250 to receive and store sorted substrates 110. In one embodiment, the substrate collection bins 140 are circularly arranged and share the common axis R as the center of the circular arrangement. The substrates 110 may be sorted into the substrate collection bins 140 in response to one or more substrate characteristics determined during one or more of the inspection processes performed in the metrology stations 116A-116E. Once the sorter 120 transfers the substrates 110 to a collection location 250 for a substrate collection bin 140, the pressure of the vacuum applicator 130 above the substrate 110 is raised above a threshold amount, and the substrate 110 is released from the rotator into the appropriate substrate collection bin 140.

The substrate collection bins 140 may each be individually removable from the sorting unit 106. Although not shown, it is contemplated that an additional substrate collection bins 140 may be positioned within the sorting unit 106 to receive substrates 110 which may inadvertently be omitted from sorting, thus preventing damage to such substrates. Additionally, a rejection bin may be positioned within the sorting unit 106 to capture substrates 110 which have been rejected by one or more of the metrology stations 116A-116E of the modular unit 104. As such, the sorter 120 may deliver a damaged substrate to the rejection bin.

As discussed above, the support platform 122 may be coupled with a rotary actuator 128, such as a pneumatic, hydraulic or an electric motor. The rotary actuator 128 rotates the support platform 122 continuously in a non-indexing manner. With the assist of sensors that detect positions of the substrate 110, the substrate 110 can be picked up from the carrier 111 by application of vacuum to the vacuum applicator 130 about the loading region 133 and secured to the rotator, and then released into a substrate collection bin 140 disposed in one of the collection locations 250 arranged below the rotator. As rotator passes over all of the substrate collection bins 140, the sorter 120 can sort the substrate 110 into a desired one of the substrate collection bins 140 by turning off or sufficiently reducing the vacuum applied to the vacuum applicator 130 associated with to the section of rotator disposed over the desired collection location. In some embodiments, the sorter 120 may advantageously sort at least 15,000 substrates per hour, which is a significant improvement over other sorting systems.

FIG. 2B illustrates a cross-sectional view along the cross-sectional line S-S at the first region 133 in FIG. 2A according to an embodiment. The cross-section view shows a vacuum applicator 130, a substrate 110, a carrier 111, and a lifter 242 under the carrier 111. The carrier 111 carriers the substrate 110 and travels in a linear motion 256 toward the axis R, while the rotator 252 rotates around the axis R. The travel direction of the rotator 252 at the first region 133 is approximately perpendicular to the linear motion 256 of the carrier 111 and can be deemed as a lateral motion relative to the carrier 111. As previously disclosed in the present application, the rotator 252 rotates into the loading region 133 and continues its rotational movement without stopping. While the rotator 252 continues rotating, the vacuum applicator 130, which is motionless relative to the rotator 252, applies a vacuum through the rotator 252 that picks up the substrate 110 from the carrier 111, such as by vacuum power.

According to an embodiment, the annular rotator 252 is gas permeable and/or include a plurality of perforations for transmitting the vacuum provided by the vacuum applicator 130 to the substrate 110. The annular rotator 252 may be attached to the inner frame 125 and the outer frame 127, which are coupled with the actuator 128, such a motor, via the tubular member 129 and the support platform 122. The annular rotator 252 may be formed by a ring-shaped block with a plurality of channels. The ring-shaped block may be made of plastic, aluminum, or any other suitable materials. According to an embodiment, the vacuum applicator 130 may be a vacuum plenum that abuts an upper surface of the annular rotator 252. The vacuum plenum includes a plurality of vacuum sections, and each section of the vacuum plenum is designed to control a section of the annular rotator 252. According to an embodiment, the vacuum plenum is stationary while the annular rotator 252 rotates around the axis R. According to another embodiment, the vacuum applicator 130 is attached to the annular rotator 252 and rotates with the annular rotator 252.

To pick up the substrate 110, the vacuum applicator 130 provides vacuum to the annular rotator 252 after the annular rotator 252 has a sufficient overlap over the substrate 110. According to an embodiment, a predetermined level of vacuum is generated and maintained all the time by the vacuum applicator 130, and valves are used to control the provision of the vacuum to the annular rotator 252 and the substrate 110. The perforations of the annular rotator 252 are configured to instantly transmit the vacuum power to the substrate 110 on the carrier 111. Again, the annular rotator 252 of the annular gripper 123 continues rotating while the substrate 110 is being picked up. This parallelization of the picking up process and the rotation of the annular rotator 252 is capable of providing very high throughput for the sorting system comparing with those systems which use a serialized process for picking up and rotation, such as an indexing method.

According to an embodiment, the loading region 133 also includes a lifter 242 that is disposed under the carrier 111 and is configured to lift the substrate 110 using a stream of air. The lifter 242 may include a plurality of air nozzles that release air jets at proper time and with strength to lift the substrate 110 toward the annular rotator 252. The carrier 111 further includes a plurality of perforations 246 that allow the air stream released by the lifter 242 to reach the substrate 110. The lifter 242 is capable of assisting the vacuum applicator 130 to pick up the substrate 110.

According to another embodiment, the first region 133 may further include an assisting vacuum applicator 248 located adjacent to the annular rotator 252. In certain situations, the vacuum generated by the vacuum applicator 130 may not be powerful enough to pick up the substrate 110. Thus, the assisting vacuum applicator 248 may be used together with the vacuum applicator 130 to pick up the substrate 110. Once the substrate 110 is picked up, the vacuum applicator 130 generates enough suction force to retain the substrate 110 to the rotator 252 without additional assistance, and the assistance by the lifter 242 and the assisting vacuum applicator 248 may be turned off. The assisting vacuum applicator 248 may include a plurality of Bernoulli gripper 254 or any other suitable grippers. According to an embodiment the assisting vacuum applicator 248 represents a stationary vacuum applicator disposed within the loading region 133 and does not rotate with the annular gripper 123. According to another embodiment, the assisting vacuum applicator 248 is attached to the annular rotator 252 and moves together with the annular rotator 252.

Figure 2C:
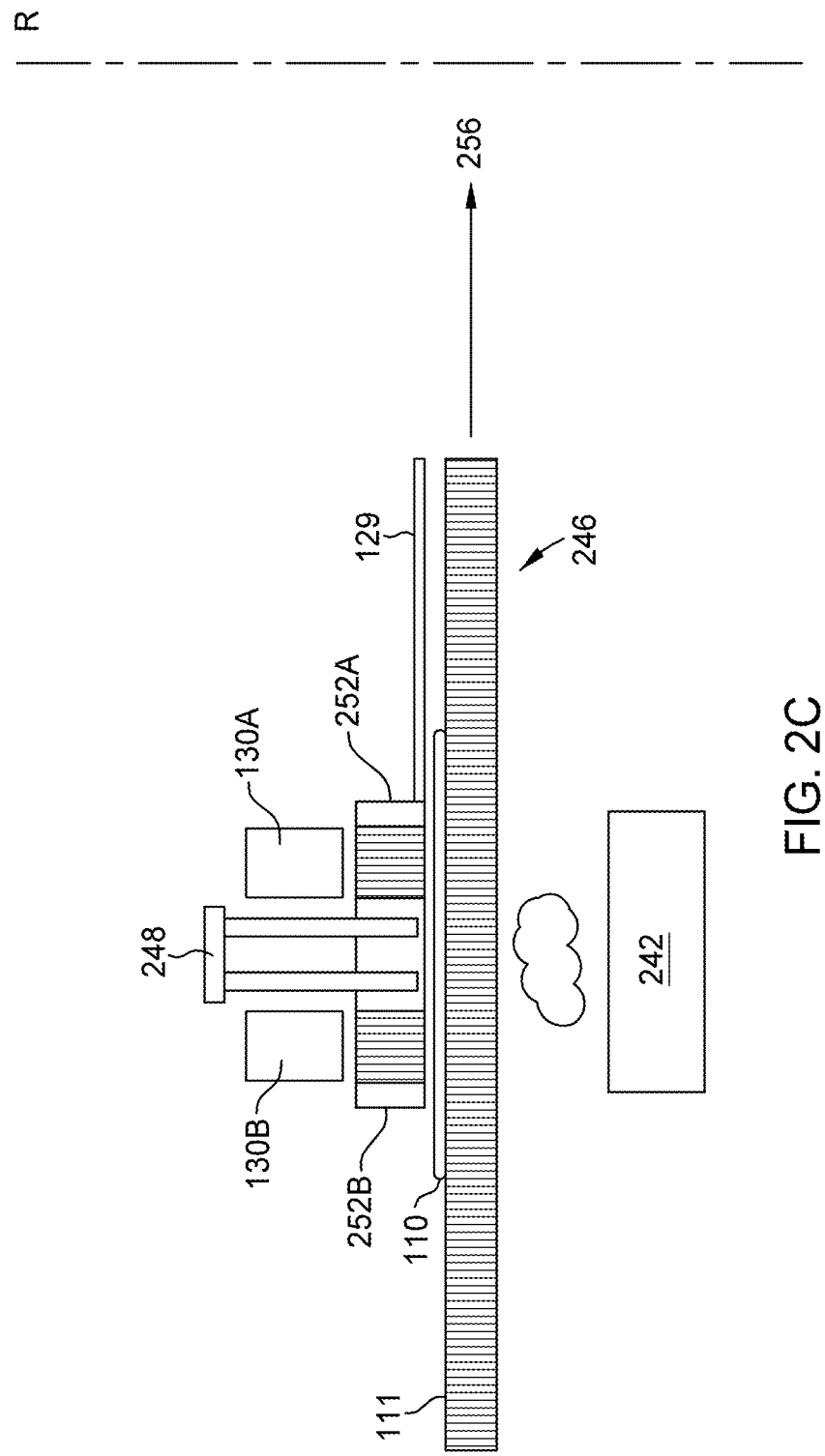
FIG. 2C illustrates a cross-sectional view of a loading region in FIG. 1, according to one embodiment.

FIG. 2C illustrates a cross-sectional view along the cross-sectional line S-S at the first region 133 in FIG. 2A according to another embodiment. FIG. 2C illustrates that the assisting vacuum applicator 248 may be disposed centrally between two concentric annular rotators 252A, B. The concentric annular rotators 252A, B are both coupled to the support frame, with each rotator sections 252A or B interfaced with at least one vacuum applicator 130. The centrally disposed vacuum applicator 248 shown in FIG. 2C is in contrast to the peripherally disposed assisting vacuum applicator 248 shown in FIG. 2B. According to an embodiment, each vacuum applicator 130 may be separated into a plurality of vacuum sections 130A and 130B, and the assisting vacuum applicator 248 is disposed between those vacuum sections 130A and 130B. According to an embodiment, the vacuum section 130A and the vacuum section 130B are concentrically disposed around the axis R.

Figure 2D:
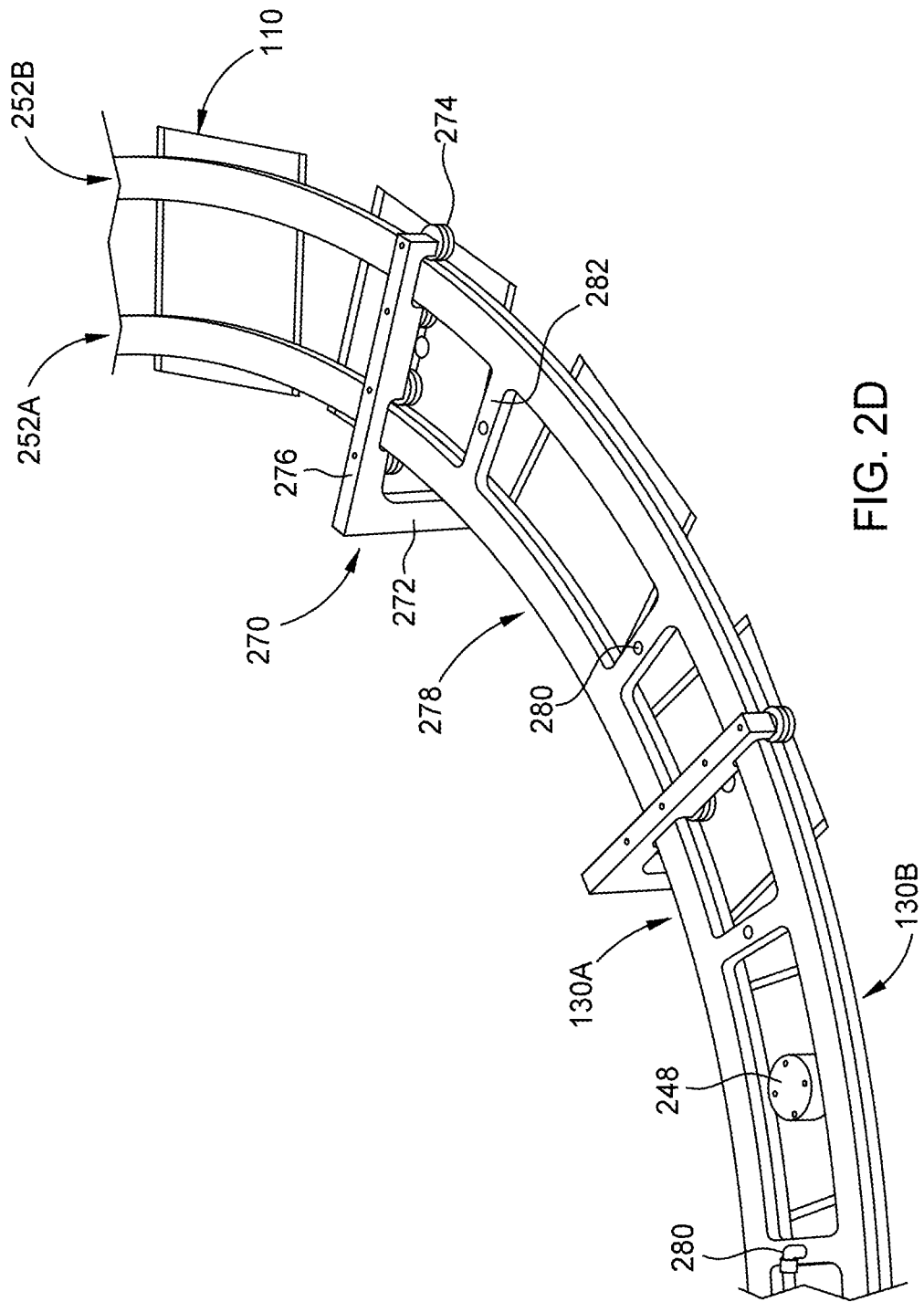
FIG. 2D illustrates a perspective partial view of a high speed substrate sorter, according to one embodiment.

FIG. 2D illustrates a perspective partial view of a high speed substrate sorter, according to one embodiment. As shown in FIG. 2D, the rotator 252 of the annular gripper 123 includes two concentric sections 252A and 252B that hold up a plurality of substrates 110. The high speed substrate sorter includes a roller module 270 configured to engage with the rotator 252 and rotate the same. According to an embodiment, the roller module 270 includes a leg 272 coupled with a cantilever beam 276. The leg 272 is attached to the ground or other parts of the high speed substrate sorter. The cantilever beam 276 is disposed above the rotator 252 and coupled with a plurality of rollers 274 that engage with concentric sections 252A and 252B. As shown in FIG. 2D, each of sections 252A or 252B has two rollers 274 engaging with its side walls. The rollers 274 are driven by suitable actuation mechanisms, such as a motor. When the rollers 274 rotate, they cause the rotator 252 to spin due to the contract force between the rollers 274 and the sections 252A and 252B. According to an embodiment, the high speed substrate sorter may include a plurality of roller modules 270 coupled by concentric members 278. These concentric members 278 largely conform to the shapes of the concentric sections 252A and 252B.

As shown in FIG. 2D, the vacuum applicator 130 includes two concentric sections 130A and 130B whose shapes also conform to the shapes of the concentric sections 252A and 252B. The concentric sections 130A and 130B are connected with each other by connecting members 282. Openings 280 are provided on the connecting members 232 to allow vacuum to enter the vacuum applicator 130. According to an embodiment, an assisting vacuum applicator 248, such as a Bernoulli picker, is disposed between the concentric sections 252A and 252B at the loading region 133.

Figure 3:
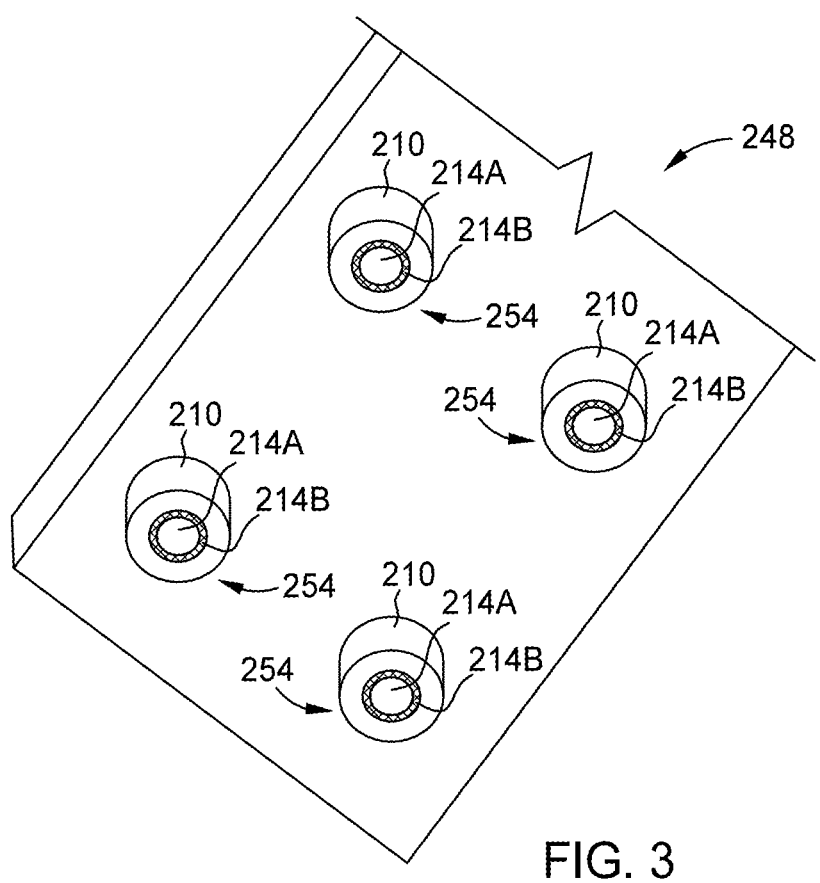
FIG. 3 illustrates a perspective view of at least one Bernoulli picker of the high speed substrate sorter, according to one embodiment.

FIG. 3 illustrates a perspective bottom view of the at least one assisting vacuum applicator 248 of the sorter 120. In the embodiment of FIG. 3, four grippers 254 are shown; however it is contemplated that any number of grippers 254 may be utilized, including one gripper 254. In one embodiment, each gripper 254 may be a Bernoulli picker 210. Each Bernoulli picker 210 may extend downward in order to lift the substrate 110, or simply generate enough vacuum force to pull the substrate 110 to the rotator 252. The location of each Bernoulli picker 210 is dependent upon the number of Bernoulli pickers utilized. In one embodiment, only one Bernoulli picker 210 may be utilized, and as such, it is contemplated that the Bernoulli picker 210 may be centrally located between two vacuum applicators 130, or alternatively to either side of a single vacuum applicator 130.

Each Bernoulli picker 210 may operate to provide a soft-contact transfer of the substrate 110 by applying airflow between a non-contact surface 214A of the Bernoulli picker 210 and the substrate 110. The airflow from the non-contact surface 214A may create vacuum and lift forces on a surface of the substrate 110. A stop 214B may be located between the non-contact surface 214A of the Bernoulli picker and the substrate 110. The stop 214B may prevent the substrate 110 from sliding or moving off of the Bernoulli picker 210 as the substrate is sorted. The stop 214B may be a thin material, such as a material which may not damage the substrate 110. The stop 214B may prevent contact of the substrate 110 with the non-contact surface 214A of the Bernoulli picker 210. In an embodiment, the substrate 110 does not contact the Bernoulli picker 210 directly, but rather may contact the bottom surface of the vacuum applicator 130.

Figure 4A:
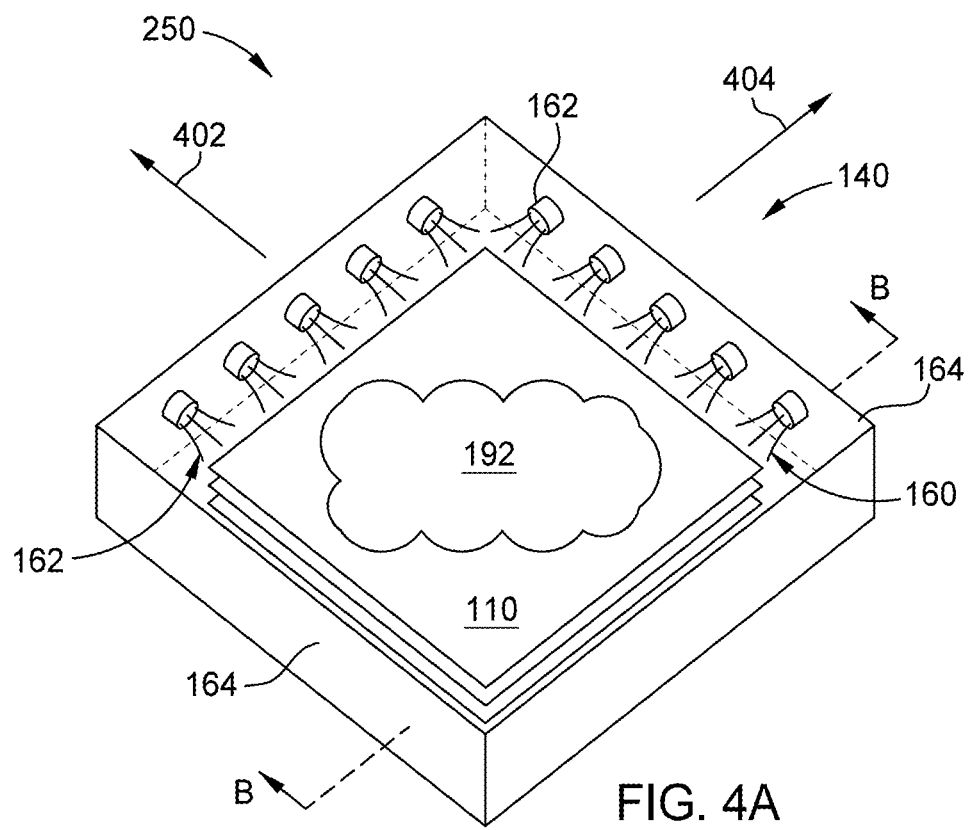
FIG. 4A illustrates a perspective view of a substrate collection bin, according to one embodiment.

FIG. 4A illustrates a perspective view of a collection location 250 and a substrate collection bin 140, according to one embodiment. Each substrate 110 is sorted into a substrate collection bin 140 residing in a collection location 250 based upon the inspection data obtained in one or more of the metrology stations 116A-116E. According to an embodiment, both the substrate collection bin 140 and the vacuum applicator 130 are stationary and paired to ease control. As the substrate is positioned over the appropriate bin, the sorter 120 continues rotating without stop. A substrate 110 which is positioned over the appropriate bin 140 may be released from the respective rotator 252 such that the substrate is dropped into the substrate collection bin 140. The release may be implemented by turning off the vacuum of a paired vacuum applicator 130 and letting the substrate 110 drop by gravity. According to an embodiment, a stream of air is released by a paired section of the vacuum plenum to push the substrate 110 off the annular rotator 252. The stream of air may be generated by reversing the operation of the vacuum applicator 130.

The determination of the location to release the substrate 110 takes into account tangential and radial momentums of the substrate 110 such that the released substrate 110 can precisely reach a designated substrate collection bin. When the substrate 110 reaches the designated substrate collection bin, the substrate 110 encounters an air pillow 192, or resistance, which slows down the fall and other motions of the substrate 110. The air pillow 192 may provide resistance to a falling substrate 110 such that the substrate 110 gently falls into the substrate collection bin 140.

As further illustrated in FIG. 4A, in certain embodiments, the collection location 250 may optionally include a frame 164 that secures a plurality of first gas nozzles 162 and a plurality of second gas nozzles 160. The frame 164 is disposed at a location such that a filled bin 140 may be removed from the collection location 250 without any interference from the frame 164. The plurality of the first gas nozzles 162 are oriented opposite to a tangential movement 402 of a released substrate 110, while the plurality of the second gas nozzles 160 are oriented opposite to a radial movement 404 of a released substrate 110. The optional gas nozzles 160 and 162 may release a pressurized gas, such as air, oxygen, or any other suitable pressurized or non-pressurized gas, to slow down or dampen the radial and tangential momentums of the release substrate 110, respectively. The amount of air released by the gas nozzles 160 and 162 may be controlled by the controller 190.

It is contemplated that the frame 164 having the gas nozzles 160 and 162 may be disposed at locations other than the inside of a substrate collection bin 140. For example, the frame 164 and the gas nozzles 160 and 162 may be disposed at an area that is slightly under the annular gripper 123 and above the substrate collection bin 140. Other locations may also be selected as long as the jet of gas released by the nozzles 160 and 162 can slow down the tangential and radial motions of a released substrate 110.

Figure 4B:
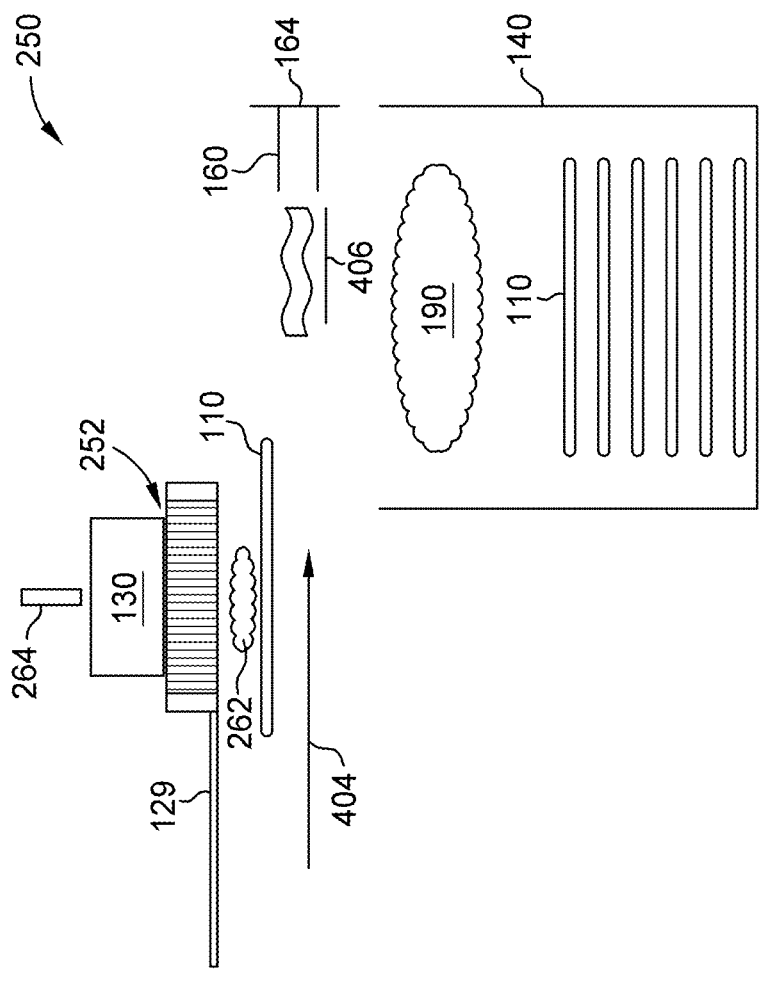
FIG. 4B illustrates a cross-sectional view of a substrate collection location, according to one embodiment.

FIG. 4B illustrates a cross-sectional view along the cross-sectional line B-B at the substrate collection bin 140 of FIG. 4A, according to one embodiment. The substrate 110 is released by a vacuum applicator 130. A stream of air 262 may be generated by the vacuum applicator 130 or a separate nozzle 264 to push the substrate 110 off the annular rotator 252. As the substrate 110 is released by a vacuum applicator 130, it has tendency to maintain its momentum generated by the rotation velocity of the substrate 110 attached to the rotating rotator 252. As shown in FIG. 4B, the substrate 110 continues traveling along a radial direction 404 (in addition to a tangential direction). This is different from a sorting system using an indexing motion, in which a gripper stops any rotational movement before releasing a substrate into a substrate collection bin. In the sorting system with an indexing motion, a substrate is dropped into a substrate collection bin with essentially no tangential or radial motion. To slow down the radial and tangential movements of the substrate 110, the collection location 250 in which the bin 140 resides includes one or more gas nozzles 160 and 162 secured by a frame 164 and arranged in directions opposite to the radial and tangential movements of the substrate 110. The tangential movement of the released substrate can be similarly dampened as that of the radial movement by the gas nozzles 162.

Figure 5:
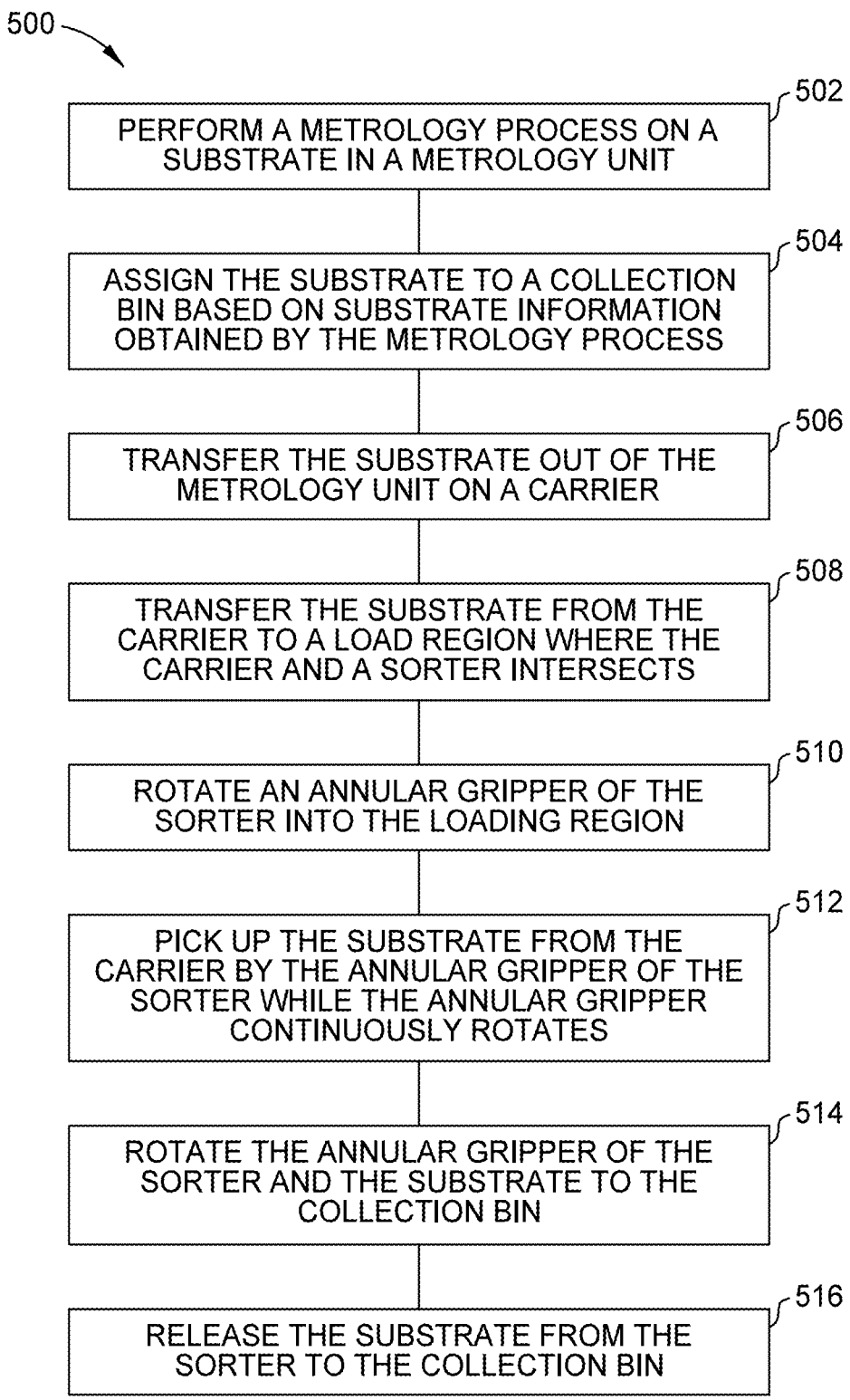
FIG. 5 illustrates a flow diagram of a method for sorting substrates, according to one embodiment.

FIG. 5 illustrates a flow diagram 500 of a method for inspecting and sorting a plurality of substrates, according to one embodiment. Flow diagram 500 begins at operation 502, in which a cassette holding a plurality of substrates for inspection is positioned at a loading station of an inspection system. A loading unit loads the plurality of substrates 110 into the inspection system 100. A conveyor system 114 of the inspection system moves the substrate through various modular units, such as metrology stations 116A-116E. Once a metrology unit receives the substrate 110, a metrology process is performed on the substrate in the modular unit 104. The substrate may be inspected by a first metrology station, such as metrology station 116A. By way of example only, the metrology station 116A may be a micro-crack inspection unit, a thickness measuring unit, a resistivity measuring unit, a photoluminescence unit, a geometry inspection unit, or a saw mark detection unit. Any number of metrology units may be comprised along the conveyor system 114 within the modular unit 104.

At operation 504, the substrate 110 may be assigned to a substrate collection bin 140 based on the substrate information obtained by the various metrology units. The substrate information includes metrology data and inspection results. The substrate information obtained by the various metrology units may be sent to a yield analysis server which may analyze the data and inspection results and assign the substrate to a substrate collection bin 140. To illustrate, by way of example only, metrology station 116A may be a micro-crack inspection unit. If metrology station 116A inspects a substrate and determines that the substrate contains one or more micro-cracks, such data may be sent to the yield analysis server. The yield analysis server may then determine that due to the micro-cracks, that particular substrate is assigned to, for example, substrate collection bin D.

At operation 506, the substrate 110 is placed on a carrier 111 that transfers the substrate 110 out of the metrology unit. According to an embodiment, the carrier 111 transfers the substrate 110 in a linear motion toward an axis R of the sorter unit.

At operation 508, the carrier 111 transfers the substrate 110 to a loading region 133 where an annular gripper 123 and the carrier 111 intersects with each other.

At operation 510, the annular gripper 123 includes an annular rotator 252 that continuously rotates around the axis R in a non-indexing manner. The rotator 252 rotates into the loading region 133 and intersects with the carrier 111 that carries the substrate 110. The annular griper 123 further includes a plurality of vacuum applicators 130. According to an embodiment, the plurality of vacuum applicators 130 are kept stationary relative to the axis.

At operation 512, a vacuum applicator 130 of the annular gripper 123 picks up the substrate 110 by using vacuum power applied through the rotator 252 while the rotator 252 of the annular gripper 123 continues rotating. A stream of air may be released under the substrate 110 by a lifter 242 to lift the substrate toward the rotator 252. In addition, operation 510 may also use an assisting vacuum applicator 248, such as a Bernoulli gripper, to assist the vacuum applicator 130 to lift the substrate into contact with the rotator 252.

At operation 514, the stationary vacuum applicators 130 retains the substrate 110 in place against the rotator 252 by using vacuum. The substrate 110 retained against the rotator 252 continues rotating toward a substrate collection bin 140 disposed in a collection location 250. Vacuum applicators 130 abutting an upper surface of the gas permeable rotator 252 of the annular gripper 123 maintains the vacuum above a predetermined level sufficient to hold the substrate 110 against the rotating rotator 252. The vacuum level is maintained within the vacuum plenum or applicator 130 until the substrate 110 is adjacent to the substrate collection bin 140.

At operation 516, when the rotating rotator 252 moves the substrate 110 to a substrate collection location, the pressure of the vacuum applicator 130 is raised above a threshold amount such that the vacuum power is reduced to a level that cannot retain the substrate 110 against the rotating rotator 252, thus allowing the substrate 110 to fall free from the annular gripper 123. The substrate 110 is then released while the rotator 252 continue rotating. The pressure of the vacuum applicators 130 may be raised by simply turning off the vacuum or by injecting gas into the plenum of the vacuum applicators 130. A substrate collection bin 140 is disposed at the substrate collection location to receive the substrate 110. The substrate collection location and bin may include a plurality of gas nozzles 162 and 160 oriented to directions opposite to the radial and tangential movements of the released substrate 110. The gas nozzles 162 and 160 release a jet of gas to dampen the radial and tangential movements of the released substrate 110.

It will be appreciated to those skilled in the art that the preceding examples are exemplary and not limiting. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed is:

1. A substrate sorter comprising:
    an annular gripper operable to rotate about an axis;
    a plurality of vacuum applicators having an annular arrangement about the axis, the plurality of vacuum applicators operable to hold substrates against the annular gripper; and
    an actuator coupled to the annular gripper and operable to rotate the annular gripper about the axis relative to the plurality of vacuum applicators while the plurality of vacuum applicators hold the substrates against the annular gripper, a first vacuum applicator of the plurality of vacuum applicators operable to release a first substrate while a second vacuum applicator of the plurality of vacuum applicators retains a second substrate against the annular gripper.

2. The substrate sorter of claim 1, wherein the vacuum applicators are stationary.

3. The substrate sorter of claim 1, wherein the actuator is operable to rotate the annular gripper in a non-indexing motion.

4. The substrate sorter of claim 1, wherein the annular gripper is operable to move a substrate between two of the plurality of vacuum applicators.

5. The substrate sorter of claim 1, wherein as the annular gripper rotates, a substrate is sequentially retained against the annular gripper by vacuum applied by different ones of the vacuum applicators.

6. The substrate sorter of claim 1 further comprising:
a loading region defined under a portion of the annular gripper, the loading region having a lifter operable to direct a stream of air toward the annular gripper.

7. The substrate sorter of claim 6, wherein the lifter and vacuum applicators are disposed on opposite sides of the annular gripper.

8. The substrate sorter of claim 1 further comprising:
a metrology unit; and
a substrate mover configured to move a substrate from the metrology unit to a loading region defined under a portion of the annular gripper.

9. A substrate sorter comprising:
a loading region configured to receive a substrate to be sorted; and
a plurality of vacuum applicators disposed in an annular arrangement about an axis, at least some of the plurality of vacuum applicators disposed over the loading region, the plurality of vacuum applicators operable to retain the substrate while the substrate is transported rotationally about the axis while remaining in a fixed position relative to the loading region.

10. The substrate sorter of claim 9 further comprising:
an annular gripper disposed below the plurality of vacuum applicators and configured to receive the substrate when retained by the plurality of vacuum applicators, the annular gripper disposed in an annular arrangement about the axis, wherein the annular gripper is rotatable about the axis.

11. The substrate sorter of claim 10, wherein the annular gripper is operable to move a substrate between two of the plurality of vacuum applicators.

12. The substrate sorter of claim 10, wherein as the annular gripper rotates, a substrate is sequentially retained against the annular gripper by vacuum applied by different ones of the vacuum applicators.

13. The substrate sorter of claim 10, wherein the loading region is defined under a portion of the annular gripper, the loading region having a lifter operable to direct a stream of air toward the annular gripper.

14. The substrate sorter of claim 13, wherein the lifter and vacuum applicators are disposed on opposite sides of the annular gripper.

15. The substrate sorter of claim 9 further comprising:
a metrology unit; and
a substrate mover configured to move a substrate from the metrology unit to the loading region.

16. The substrate sorter of claim 15, wherein the plurality of vacuum applicators are disposed in a fixed position.

17. The substrate sorter of claim 16, wherein the plurality of vacuum applicators are configured to release the substrate at a location selected from a plurality of predefined locations other than the loading region.

18. The substrate sorter of claim 17, wherein the location selected to release the substrate is based on information obtained from the metrology unit.

19. A method of inspecting and sorting a plurality of substrates, the method comprising:
securing a substrate exiting a metrology unit to a bottom surface rotating about an axis via a plurality of vacuum applicators, the plurality of vacuum applicators fixed in position relative to the bottom surface;
rotating the substrate about the axis while secured to the bottom surface by different ones of the plurality of vacuum applicators; and
releasing the substrate from the rotating bottom surface based on inspection results obtained in the metrology unit.

* * * * *